Oct. 19, 1943.  E. WILDHABER  2,332,420
METHOD AND APPARATUS FOR RELIEVING CUTTERS
Filed April 12, 1941  4 Sheets-Sheet 1
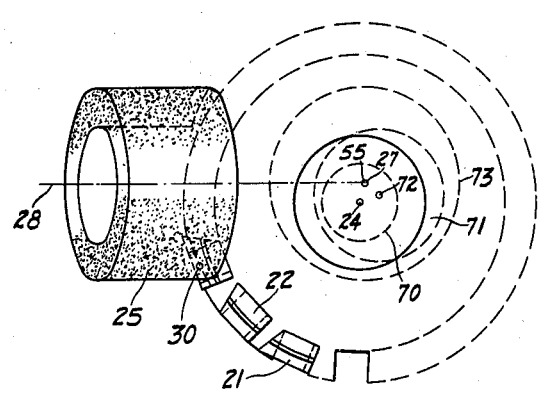
Fig. 1
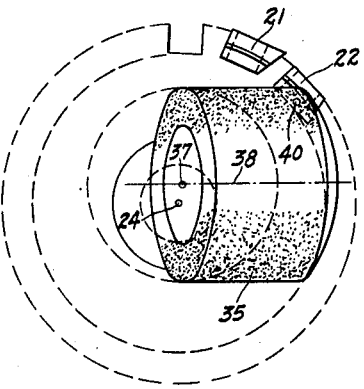
Fig. 3
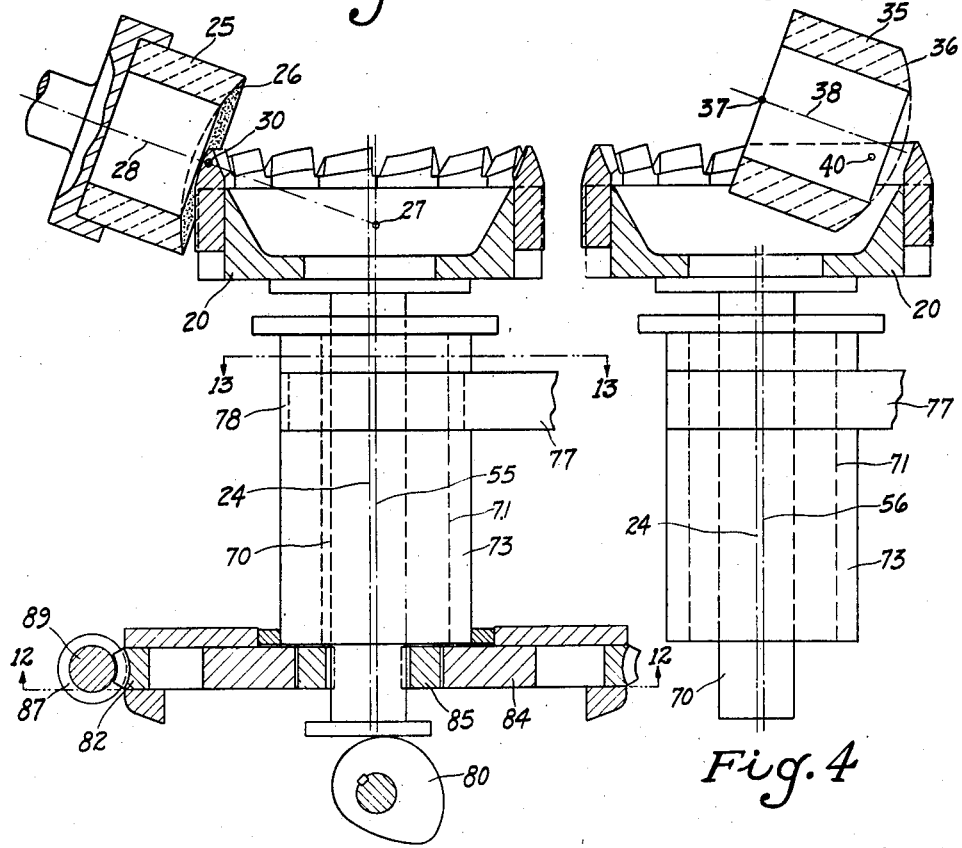
Fig. 2
Fig. 4
Inventor
ERNEST WILDHABER
Attorney Oct. 19, 1943.  E. WILDHABER  2,332,420
METHOD AND APPARATUS FOR RELIEVING CUTTERS
Filed April 12, 1941  4 Sheets-Sheet 2

Inventor
ERNEST WILDHABER

By
Attorney

Oct. 19, 1943.  E. WILDHABER  2,332,420
METHOD AND APPARATUS FOR RELIEVING CUTTERS
Filed April 12, 1941   4 Sheets-Sheet 3

Inventor
ERNEST WILDHABER
By *[signature]*
Attorney

Oct. 19, 1943.　　　　E. WILDHABER　　　　2,332,420
METHOD AND APPARATUS FOR RELIEVING CUTTERS
Filed April 12, 1941　　　4 Sheets-Sheet 4

Inventor
ERNEST WILDHABER
By
B. E. Schlesinger
Attorney

Patented Oct. 19, 1943

2,332,420

UNITED STATES PATENT OFFICE 2,332,420

METHOD AND APPARATUS FOR RELIEVING CUTTERS

Ernest Wildhaber, Brighton, N. Y., assignor to Gleason Works, Rochester, N. Y., a corporation of New York Application April 12, 1941, Serial No. 388,228

21 Claims. (Cl. 51—288)

The present invention relates to the relief-grinding of the side surfaces of blades of face-mill gear cutters, and particularly to the relief-grinding of the side surfaces of blades of spherical and near-spherical face-mill gear cutters.

One object of the present invention is to provide a method for relief-grinding spherical face-mill gear cutter blades which will be at least as fast as the methods employed at present for the relief-grinding of the conventional type of face-mill gear cutter blades having straight side-cutting edges.

A further object of the invention is to provide a method for relief-grinding face-mill gear cutter blades having cutting edges of either straight or curved profile, which will permit of grinding all of the blades of a cutter on both inside and outside surfaces, in a single set-up of the grinding machine and in a single blade-carrying head.

Another object of the invention is to provide a method for relief-grinding face-mill gear cutter blades which will permit of grinding blades of segmental and integral blade type face-mill gear cutters as well as of inserted blade type cutters for the full length of the blades from front to rear.

Still another object of the invention is to provide apparatus of relatively simple structure for practicing the process of the invention.

Other objects of the invention will be apparent hereinafter from the specification and from the recital of the appended claims.

For relief-grinding the side-surface of a face-mill cutter blade by the process of the present invention, a cup-type grinding wheel is employed, and the grinding is done with the tip surface of the wheel. The wheel is so positioned that the periphery of the wheel extends in the general direction of the blade height. For relief-grinding a spherical cutter blade the tip surface of the grinding wheel is dressed to spherical shape. For grinding the outside surface of the blade, a wheel is used whose tip is dressed to concave spherical shape, and for grinding the inside surface of the blade, a wheel is employed whose tip face is dressed to convex spherical shape. Each grinding wheel is tilted to incline the axis of the wheel at an angle to a plane perpendicular to the axis of the blade-carrying head approximately equal to the pressure angle of the blade surface to be ground. The blades are mounted in their own head or in a dummy head to extend in a direction parallel to the axis of the head. In the grinding operation, the blade-carrying head is rotated past the rotating wheel and simultaneously a relative reciprocatory movement is produced between the wheel and head once for each blade to be ground, as in the conventional process of axially relief-grinding face-mill cutter blades. In addition, however, with the process of the present invention, there is a swinging movement effected between the blade carrying head and wheel during grinding of each blade. This swinging movement is about an axis which is parallel to the axis of the blade-carrying head and which, for spherical blades, passes through the sphere center of the tip surface of the grinding wheel. The motion serves to maintain the active surface of the wheel substantially opposite the blade during the grinding of the side of the blade from front to rear. This permits grinding of the blade surface for its full length with very slight relative angular displacement between the wheel and blade so as to minimize any possibility of interference between the wheel and the blade next to that which is being ground. In addition, a further oscillatory movement may be imparted to the blade-carrying head which may be superimposed on the rotary movement of this head in such way as to slow up the rotation of the head or even to make the head stand still momentarily after the side of a blade has been ground for its full length. This enables the wheel to be moved back to initial position ready to grind the next blade of the cutter while the head rotation is slowed down or while the head is even actually standing still. Thus the whole of the side surface of a blade, even of an integral or segmental type cutter, may be ground for its full length from front to rear without danger of the wheel interfering with the next blade of the cutter.

Where blades of other than spherical type are to be relieved, the wheel is, of course, dressed to whatever shape is suitable. Thus for grinding the outside surfaces of blades of straight profile, a cupped wheel will be used having a plane tip surface perpendicular to the axis of the wheel. In the relief-grinding of the outside surfaces of straight profile blades with such a wheel, however, the swinging motion need not be employed. The line of contact between such a wheel and the cutter blade extends in the direction of the blade height and the wheel can relieve a blade for its full effective length without interfering with the next blade.

In the drawings:

Fig. 1 is a plan view and Fig. 2 a sectional view, illustrating diagrammatically the process of the present invention as applied to the relief-grinding of the outside surfaces of blades of a spherical face-mill gear cutter, and showing diagrammatically one form of apparatus which may be used for this purpose;

Figs. 3 and 4 are corresponding plan and sectional views, illustrating diagrammatically how the process may be applied to the relief-grinding of the inside surfaces of blades of a spherical cutter;

Figure 13:
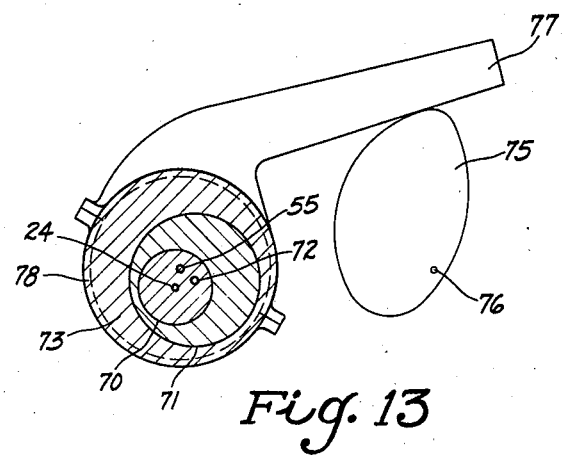
Figure 14:
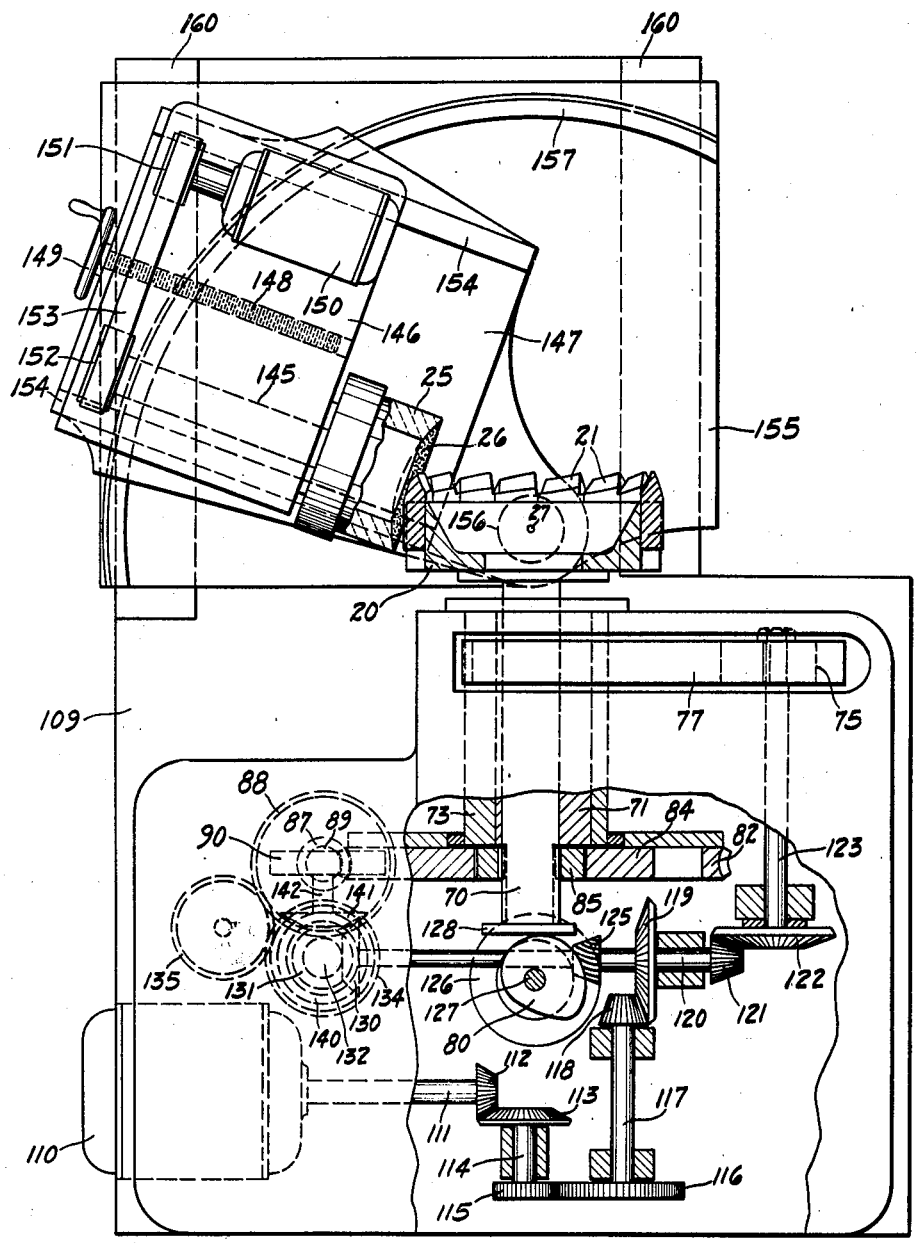

Fig. 13 is a more or less diagrammatic view, taken on the line 13—13 of Fig. 2, looking in the direction of the arrows and illustrating one means for effecting the relative oscillatory movement between the grinding wheel and cutter to maintain the wheel abreast of a blade during the relief-grinding of a blade; and Fig. 14 is an elevational view, with parts broken away, of a complete relieving grinder constructed in accordance with the present invention.

For relief-grinding the side surfaces of spherical blades, the blades are preferably mounted in a dummy head such as designated at 20 in Figs. 1 to 4 inclusive. The dummy head dished to insure sufficient clearance for the grinding wheel which is employed to grind the inside surfaces of the blades, but otherwise the dummy head may be of the same structure as a cutting head and the cutter blades are positioned in the dummy head in the same position as in the actual cutting head. Only one dummy head is required for any given diameter of cutter regardless of pressure angle.

Figs. 1 to 4 illustrate the relief-grinding of blades of a cutter that has alternate outside and inside blades. The outside blades are denoted at 21 and the inside blades at 22. The blades are positioned in the dummy head 20 so that they extend in the direction of the axis 24 of the head.

For grinding the outside surfaces, a cup-shaped grinding wheel 25 is employed whose tip surface 26 is dressed to a concave spherical surface. The center of this concave spherical surface of the wheel is denoted at 27. The axis 28 of the wheel passes, of course, through the sphere center 27.

The wheel 25 is positioned so that the sphere center 27 is offset from the axis 24 of the dummy head and so that the axis 28 of the wheel is inclined to a plane perpendicular to the axis 24 at an angle equalling approximately the pressure angle of the outside surfaces of the blades. In the position shown in Figs. 1 and 2, the wheel has grinding contact with the outside surface of a blade 21 along a line containing a mean point 30.

For grinding the inside surfaces of the blades, a grinding wheel 35 is used which has its tip surface 36 dressed to a convex spherical shape. The center of this convex grinding surface is at 37 on the axis 38 of the wheel. In the positions shown in Figs. 3 and 4, the wheel is operating on an inside blade 22, and contact between the wheel and the inside surface of the blade is along a line passing through the mean point 40.

For relief-grinding either the inside or the outside surfaces of the blades, a relieving motion is employed which is primarily a helical motion and which may be primarily of the same type as is employed in conventional practice for the axial relief-grinding of face-mill cutter blades. Such a relief-grinding motion may consist of rotation of the dummy head 20 about its axis 24 and of reciprocation of the dummy head in the direction of its axis 24. The reciprocatory motion is timed to the rotation of the dummy head to take place once for each blade to be relieved. The rotary motion of the head 20 serves to pass the blades successively under the grinding wheel, and the reciprocatory movement serves to advance each blade into the grinding wheel during the grinding of the side surface of the blade, and then to return the cutter head to initial position again ready for the grinding of the next blade.

The contact between a grinding wheel and the side surface of a blade being relieved is along a circular arc whose plane is perpendicular to the helix described by the sphere center. Said helix is the relative path of the sphere center about the cutter axis as traced on account of the helical relieving motions. It can easily be computed or may also be obtained by trial after a mean normal of the relieved surface has been determined in known manner.

Figure 5:
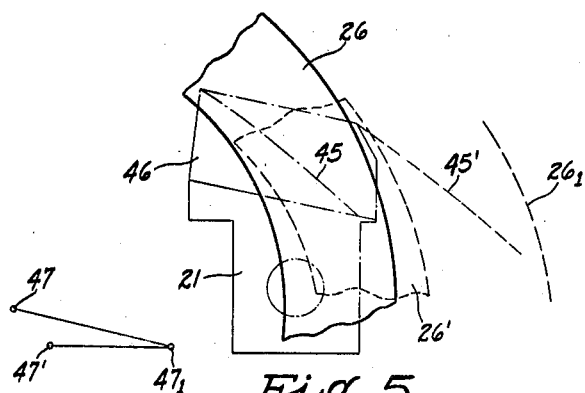
Fig. 5 is a diagrammatic view illustrating the relative motions of grinding wheel and cutter blade during the relief-grinding of the outside surface of a blade of an inserted blade type spherical face-mill cutter according to the method of the present invention.
Figure 6:
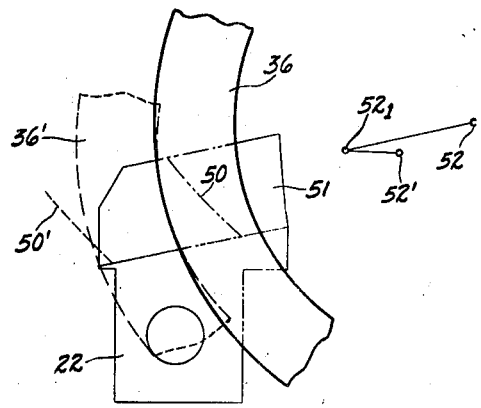
Fig. 6 is a similar view showing the relative motions between wheel and blade during the relief-grinding of the inside surface of a spherical cutter blade according to the method of the present invention.

In Fig. 5, 45 denotes a line of instantaneous grinding contact between the concave spherical surface 26 of the grinding wheel 25 and the outside surface 46 of an outside cutting blade 21. In Fig. 6, 50 denotes the line of instantaneous grinding contact between the convex spherical surface 36 of the grinding wheel 35 and the inside surface 51 of an inside cutting blade 22.

The lines of contact 45 and 50 (Figs. 5 and 6) extend diagonally across the relieved surfaces of the cutter blades. As already stated, during the relief-grinding operation, a helical motion is produced between the grinding wheel and the blade which is being relief-ground. Hence, in the relief-grinding of the outside surface 46 of the blade 21, the line of grinding contact between the concave grinding surface 26 of wheel 25 and the side surface 46 of the blade will move rearwardly and downwardly from the position 45 to the position 45'. Likewise, the line of instantaneous grinding contact between the convex grinding surface 36 of wheel 35 and the side surface 51 of the blade 22 will move rearwardly and downwardly from the position 50 to the position 50'. In the positions 45' and 50', grinding contact will be made only at the upper and lower corners, respectively, of the side surfaces of the blades. If conventional practice were employed, then, when the grinding contact were along the line 45', the outside rim of the grinding wheel 25 would be at 26₁. In this position, the grinding wheel obviously will interfere with the next blade 22 in the dummy head 20. Therefore, if the ordinary helical relieving motion were to be employed, alternate blades would have to be removed from the dummy head. The same thing is true for the relief-grinding of the inside surfaces of the blades with the wheel 35 if the ordinary helical relieving motion alone were used.

In the preferred embodiment of the present invention, however, an additional motion is introduced. This motion for the outside surfaces of the blades is a swinging motion about an axis 55 parallel to the axis 24 of the cutter head and passing through the sphere center 27, and for the inside surfaces of the blades is a swinging motion about an axis 56 also parallel to the axis 24 of the cutter head and passing through the sphere center 37. In the swinging motion, the active surface of the grinding wheel is simply shifted on the sphere without displacement of the sphere. The shape produced on a side surface of a blade is therefore unchanged. It is identical with the shape produced in a helical relieving motion.

The relative swing about the axis 55 or 56 is in a direction opposite to the direction of rotation of the dummy head to keep the wheel and the blade surface, which is being ground, more nearly lined up with each other at the ends of the blade surface. Thus, as diagrammatically illustrated in Fig. 5, a swinging motion is imparted to the grinding wheel 25, during the relief-grinding of the outside surface 46 of the blade 21 such that the grinding wheel will have a position such as denoted at 26', when grinding the rear end of the blade surface 46, instead of a position such as denoted at 26₁. In the mean position of the grinding wheel, such as shown in full lines at 26 in Fig. 5, the center of the grinding wheel periphery is denoted at 47. Were a standard helical motion to be employed, the center of the wheel periphery would be at 47₁ for the end position 26₁. But where the process of the present invention is used and a swinging motion is employed in addition to the helical motion, the center of the wheel periphery will be at 47' for the end position 26' of the wheel.

In similar manner for the grinding of the inside surfaces of the blades, as illustrated diagrammatically in Fig. 6, the swinging motion imparted to the wheel 35 will be such that the active surface of the grinding wheel will have a position, such as denoted in dotted lines at 36', when grinding the rear end of the inside surface 51 of the blade 22. In Fig. 6, 52 denotes the center of the wheel periphery for the mean position shown in full lines at 36. 52₁ denotes the position of the wheel center where a standard helical motion is employed. 52' denotes the center of the wheel periphery for the end position 36' when the swinging motion of the present invention is used in addition to the helical motion.

Figure 7:
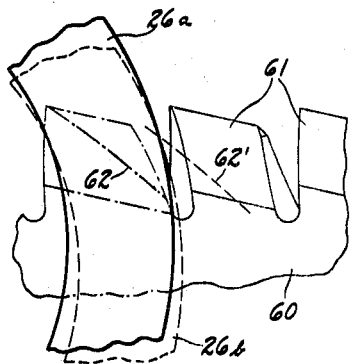
Figs. 7 and 8 are diagrammatic views showing the relief-grinding of the outside and inside surfaces, respectively, of a segmental type spherical cutter by the process of the present invention.
Figure 8:
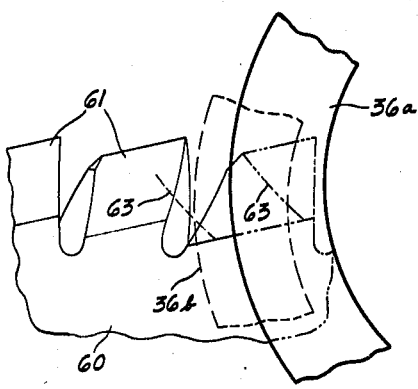

Figs. 7 and 8 illustrate the relief-grinding of the outside and inside surfaces, respectively, of spherical segmental cutters. A fragment of a segment of a cutter is denoted at 60. It is provided with a plurality of integral cutting blades 61. The same types of wheels may be used for the relief grinding of the side surfaces of these segmental cutters as for the inserted blade type of cutters, and the same motions are employed.

In Fig. 7, the position of the active surface of the grinding wheel, when the line of contact between the wheel and the outside surface of a blade being ground is at a mean position, is shown in full lines at 26ₐ. Here grinding contact is along the line 62. 26ᵦ denotes the position which the wheel has when grinding contact is along the line 62'. The wheel has been moved downwardly relative to the cutter blade in moving from the position 26ₐ to 26ᵦ, but due to the relative swinging movement of the wheel, the wheel will still be opposite the blade being ground even in the end position of grinding contact when contact is along the line 62'. It is evident that even in its end position, the wheel will not interfere with the next blade of the segment.

In Fig. 8, the outline of the active surface of the grinding wheel at a mean position is shown in full lines at 36ₐ. Here contact between the wheel and the inside surface of a blade of the segment is along the line 63. In the end position, the grinding wheel will be in the position denoted by the dotted lines 36ᵦ and grinding contact will be along the line 63'. It will be evident that due to the swinging motion of the wheel, the wheel will remain abreast of the blade surface being ground even at its end position, and that the wheel will not interfere with the next blade of the segment.

In the grinding apparatus, illustrated more or less diagrammatically in Figs. 1 to 4 inclusive, the axes 55 and 56 coincide, that is, the axis of swing is fixed and constitutes the machine center. Here the swinging motion is imparted to the dummy head rather than to the grinding wheels. The resultant relative motion, however, remains unchanged. The center or spindle, on which the dummy head is secured, may be mounted so that the axis 24 of the cutter spindle can be adjusted at various radial distances from the axis 55. This adjustment may be effected by mounting the cutter spindle 70 eccentrically in an eccentric 71 whose axis is at 72 offset from the axis 55 of the swinging member 73. The eccentric 71 is, then, itself mounted eccentrically in the swinging member 73. This is a type of mounting similar to that employed in conventional forms of spiral bevel gear generators. By angular adjustment of the eccentric 71, the distance between the axis 24 of the cutter spindle and the axis 55 of swing can be varied, and the location of the axis of the cutter about the axis of swing can also be changed.

The grinding wheels 25 and 35 will be mounted to be adjustable axially along their respective axes 28 and 38. Preferably, also, they will be mounted to be adjustable in the direction of the axis of swing 55. The axis of the wheel spindle may always remain, however, in the same plane with the axis of swing 55.

For dressing the grinding wheels, diamonds may be mounted to be adjusted to the proper sphere radii and to swing about the sphere center 27 or 37. Then, by swinging the diamonds about their sphere centers, proper spherical surfaces will be dressed on the tips of the wheels.

For oscillating the carrier 73 to effect swinging movement of the dummy head about the axis 55, the rotary cam 75 (Fig. 13) may be provided. This cam may be rotated continuously at a uniform velocity on its axis 76 to make one revolution per cutter blade to be ground. It acts against a straight-sided arm or abutment 77 which is secured to a ring member 78. The ring member 78 is mounted for angular adjustment about the carrier 73. The cam 75 may be driven from the main motor of the machine. A spring (not shown) may be employed to maintain the cam and abutment in engagement.

The carrier 73 is fixed against axial movement, but the cutter spindle 70 is mounted to reciprocate axially in the carrier to effect the relieving and return movements. For the purpose of effecting the reciprocation of the cutter spindle 70, a rotary cam 80 (Fig. 2) is provided. This cam, also rotates at a uniform velocity, and may be driven in time with the cam 75 to make one revolution per cutter blade to be relieved. The cutter spindle may be held against the periphery of the cam 80 by a coil spring (not shown). The cam 80 is so formed that during actual relief-grinding of the side surface of a blade, the cutter spindle 70 is moved axially in one direction in time with the cutter rotation, and when the relieving of the side surface of the blade has been completed, the cutter spindle is returned axially to initial position ready for the grinding of the next blade when that blade has been rotated into engagement with the wheel.

Figure 12:
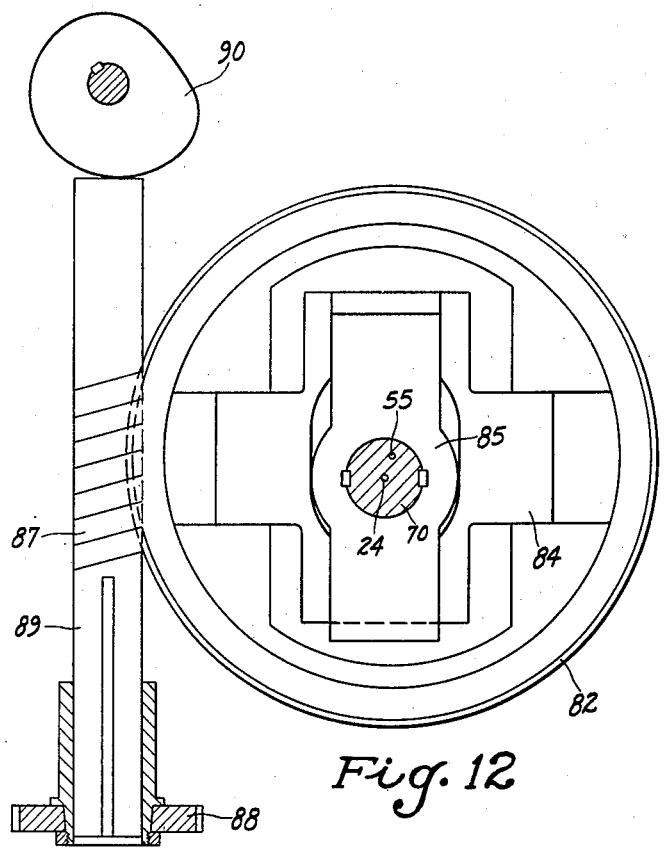
Fig. 12 is a horizontal sectional view taken on the line 12—12 of Fig. 2, looking in the direction of the arrows, and showing the means for rotating the blade-carrying head.

The rotary movement of the cutter spindle 70 is effected by rotation of a worm wheel 82 (Figs. 2 and 12) which is mounted concentric with the carrier 73. The worm wheel 82 is connected to the cutter spindle through a floating member, 84 and a bar 85. The floating member 84 is connected to the wormwheel 82 for sliding movement in one direction. The bar is keyed to the cutter spindle 70 coaxially thereof for sliding movement in a direction at right angles to the direction of movement of the floating member 84. This operative connection between the worm wheel and the spindle causes the spindle to rotate at all times in the same angular relationship with the worm wheel.

The worm wheel 82 is driven by a worm 87, which is driven at a uniform velocity in time with the rotation of the cam 80 and cam 75 through a train of gearing including the spur gear 88 which has a sliding connection with the worm shaft 89.

For relieving segmental cutters, or other cutters where there is very little angular distance between successive blades, it may be desirable to slow down the rotation of the cutter spindle, or even stop it, at the end of the relieving of each blade, so as to permit axial return movement of the cutter spindle without danger of interference of the grinding wheel with the next blade in the dummy head. For this purpose, an additional algebraic motion may be imparted to the worm 87 by a cam 90 (Fig. 12) which is adapted to move the worm shaft 89 axially. This cam may be rotated, as is the relieving cam 80 and the oscillating cam 75, once per relieving cycle, that is, once per blade to be relief ground. The cam 90 is preferably designed to produce a uniform axial motion of the worm shaft during grinding. It is driven in such direction, however, that at the moment of actual withdrawal of the cutter spindle at the end of the relief-grinding of a blade, the axial movement of the worm shaft produced by the cam 90 will be in such direction as to retard or negative the rotary movement of the cutter spindle, so that the dummy head can be withdrawn axially without danger of interference of the next blade with the wheel.

One way in which the several control cams 75, 80, and 90, and the index worm wheel 82 may be driven in the proper timed relation to effect relief of the blades of a cutter is illustrated in Fig. 14. 110 is the main drive motor which is mounted in any suitable manner on the base or frame 109 of the machine. This motor drives the oscillating cam 75 through the shaft 111, which is connected to the armature shaft of the motor, the bevel gears 112 and 113, the shaft 114, the spur gears 115 and 116, the shaft 117, the bevel gears 118 and 119, the shaft 120, the bevel gears 121 and 122, and the shaft 123 to which the cam 75 is secured. The cam 75, as already described, oscillates the carrier 73 once for each blade to be ground.

The relieving cam 80 is driven in time with the cam 75 from the shaft 120 through the hypoid pinion 125, the hypoid gear 126, and the shaft 127 to which the gear 126 and the cam 80 are fastened. The cam 80 engages a hardened contact plate or follower 128 which is secured to the lower end of the cutter spindle 70, and it reciprocates the spindle 70 once for each blade to be ground, as previously described.

The wormwheel 82 is driven in time with the cams 75 and 80 to effect rotation of the dummy head 20 from the shaft 120. This shaft has a bevel gear 130 secured to it which meshes with a bevel gear 131 that is secured to a shaft 132. The shaft 132 drives the worm shaft 89 through the spur change gears 134, 135, and 88. The last named gear is secured to the worm shaft 89 as previously described. By changing the change gears 134, 135, and 88, the cutter spindle 70 can be rotated at the proper rate in accordance with the number of blades carried by the dummy head 20.

The cam 90 for reciprocating the worm shaft 89 is driven from the shaft 132 through a bevel gear 140. This gear meshes with a bevel gear 141 which is secured to one end of a short shaft 142. The cam 90 is fastened to the opposite end of the shaft 142.

The grinding wheel, which is to be employed in the grinding operation, is secured to the wheel spindle 145. In Fig. 14, the machine is shown set up for grinding the outside surfaces of spherical cutter blades and a wheel 25 having a concave spherical tip surface 26 is shown in use. The wheel spindle 145 is journaled in a slide 146 which is mounted on a plate 147 for adjustment thereon in the direction of the axis of the wheel spindle. This adjustment may be affected by rotation of a screw shaft 148 which is journaled in the plate 147 and has threaded engagement with the slide 146. The shaft 148 may be rotated by the handwheel 149. Guide-ways 154 are provided on the upper face of the plate 147 to guide the slide 146 in its adjustment.

The grinding wheel spindle 145 is driven from a motor 150. This motor is mounted on the slide 146 and drives the spindle 145 through the pulleys 151 and 152 and the connecting belt 153.

The plate 147 is mounted on a slide 155 for angular adjustment thereon about a center 156 whose axis passes through the axis of the wheel spindle 145 and, for the spherical wheel 25, also passes through the sphere center of the active surface 26 of the wheel. The angular adjustment of the plate 147 is provided to permit correctly positioning the grinding wheel in accordance with the pressure angle of the blade surfaces to be ground. For the purpose of guiding the plate 147 in its adjustment, the slide 155 is formed on its upper face with an arcuate guide-way 157 which is concentric to the axis 27 and which engages in a corresponding guide slot formed on the under face of the plate 147.

The slide 155 is adjustable on the base 109 of the machine in a direction axial of the cutter spindle 70. The base 109 has ways 160 formed on its upper face which serve to guide the slide 155 in this adjustment.

With the method of this invention, comparatively large grinding wheels may be used in the grinding even of the inside cutting blades. Moreover, a more intimate grinding contact exists between the wheels and cutting blades than with previous methods. Thus faster relief-grinding may be obtained or a better finish, or both. Further than this, all of the blades of the cutter, both inside and outside, may be ground in the same setup.

Figure 9:
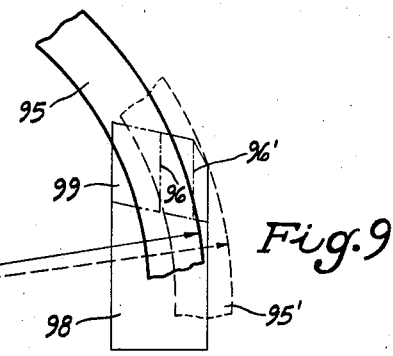
Fig. 9 is a diagrammatic view showing the relief-grinding of the outside surface of a straight sided face-mill cutter blade by the process of the present invention.

The method and machine of the present process is not limited, however, to the relief-grinding of the side surfaces of spherical blades. It may be also used for relief-grinding blades of straight or other profile, whether of inserted or segmental type. The relief-grinding of the outside surfaces of a blade 18 of straight profile is illustrated in Fig. 9. Here the grinding wheel employed has an active tip surface 95 which is plane and perpendicular to the axis of the wheel. In the relief-grinding of the straight profiled outside surface 99 of a blade such as shown at 98, the swinging motion required when grinding spherical blades, need not be employed. The side surface 99 can be ground simply by rotation of the wheel in engagement with the blade while the conventional relative helical motion for relieving is produced between the wheel and blade. Here the lines of contact between wheel and blade surface 99 extend in the direction of the height of the blade and the side surface 99 can be relieved for the full effective length of the blade without danger of interference of the wheel with the next blade. The grinding wheel is shown in heavy lines at 95 in a mean position where grinding contact is along the line 96. The center of the periphery of the wheel is then at 97. At the end of the relief-grinding operation, when the line of contact is at 96', the position of the grinding wheel will be as denoted in dotted lines at 95'. In this latter position, the center of the periphery of the wheel is at 97'. As will be clear, the wheel will not interfere with an adjacent blade at any time during the grinding operation.

Figures 10, 11:
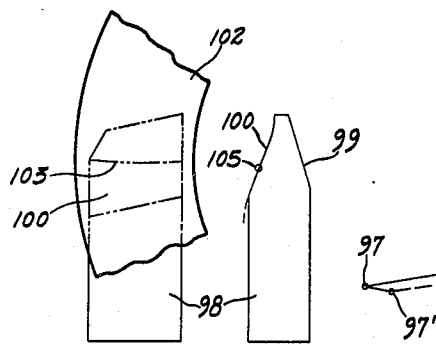
Fig. 10 is a diagrammatic view illustrating the relief-grinding of the inside surface of the blade shown in Fig. 9.
Fig. 11 is an elevational view of the blade of Figs. 9 and 10.

For grinding the inside of the blade 98, it is not possible to use a plane sided wheel. A wheel having a spherical grinding surface may, however, be employed. The active surface of such a wheel is denoted at 102, Fig. 10. The wheel will be so positioned that its sphere center is at or very near the point where the normal comes closest to the axial of the cutter spindle. Grinding contact between the surface 102 and the inside surface 100 of the blade 98 will be along a line 103. The grinding of the inside surface 100 is effected in the same way as previously described for spherical cutters except that more axial relieving motion of the cutter spindle is employed in order to completely relief-grind the whole of the inside surface of the blade from the top to the bottom thereof. With the spherical wheel, it will be found that the profile produced on the inside surface 100 of the blade is not exactly straight, but has a point of inflection 105 as shown in Fig. 11. The upper portion of the blade will project radially beyond the rest of the cutting surface in a manner similar to the projection of the smaller pressure angle portion of a "Toprem" cutting blade. This projection will not amount to more than about .002" on cutters of 9" diameter. As a matter of fact, this "Toprem" formation may be desirable and it is certainly acceptable on segmental roughing cutters.

While the invention has been described in connection with various embodiments thereof, it will be understood that it is capable of further modification, and this application is intended to cover any variations, uses, or adaptations of the invention following, in general, the principles of the invention and including such departures from the present disclosure as come within known or customary practice in the gear art and as may be applied to the essential features hereinbefore set forth and as fall within the limits of the appended claims.

Having thus described my invention, what I claim is:

1. The method of relieving the side surfaces of cutter blades which comprises rotating a blade-carrying head on its axis past a rotating grinding wheel while effecting a relative reciprocatory movement between the wheel and head in the general direction of the blade height once for each blade to be relieved, and simultaneously producing a relative oscillatory movement between the wheel and head about an axis parallel to the axis of the head once for each blade to be ground.

2. The method of relieving the side surfaces of face-mill gear cutter blades which comprises effecting a relative helical movement between a rotating grinding wheel and a blade to be relieved in one direction to effect relief of the side surface of said blade, and simultaneously producing a relative swinging movement between the wheel and blade in a direction opposite to the angular direction of said helical motion and at a rate less than the rate of said angular movement and about an axis extending in the direction of the axis of the helical movement but offset therefrom to maintain close alignment between the grinding wheel and blade throughout the whole of the relief-grinding operation.

3. The method of relieving the side surfaces of face-mill gear cutter blades which comprises rotating a grinding wheel on its axis while rotating a blade carrying head on its axis, and effecting a relative reciprocatory movement between the head and grinding wheel in the direction of the axis of the head once for each blade to be ground, and simultaneously producing once for each blade to be ground a relative swinging movement about an axis which extends in the direction of the axis of the blade carrying head and is offset therefrom, said swinging motion being at a rate less than the rate of rotation of the head and being in a direction opposite to the direction of rotation of the head during grinding so as to maintain close alignment between the grinding wheel and each blade throughout the whole of the relieving operation on said blade.

4. The method of relieving the side surfaces of face-mill gear cutter blades which comprises mounting the blades in a rotary head so that they are arranged circularly about the axis of the head and extend in the general direction of the axis of the head, and rotating the head on its axis to move the blades past a rotating relieving tool, and simultaneously effecting a relative reciprocatory movement between the head and tool in the direction of the axis of the head once for each blade to be relieved, and simultaneously producing a relative oscillatory movement between the tool and head about an axis parallel to the axis of the head once for each blade to be relieved and in such direction during the relieving of a blade as to maintain the relieving tool in substantial alignment with the blade during the relieving thereof, said rotary movement of the head being at a varying rate so as to be decelerated at the end of the relieving operation on each blade to prevent interference of the relieving tool with the next blade during the return stroke of the axial reciprocating movement.

5. The method of relieving the side surfaces of blades of a face-mill gear cutter which comprises employing a rotary grinding wheel of cupped form which has its tip surface dressed to a shape conforming to the profile shape of the blade surfaces to be relieved, mounting the blades in a rotary head so that they extend in the general direction of the axis of the head, and rotating the wheel on its axis while rotating the head on its axis and effecting a relative reciprocatory movement between the wheel and head in the direction of the axis of the head once for each blade to be relieved, and simultaneously producing a relative oscillatory movement between the wheel and head once for each blade to be relieved about an axis offset from but parallel to the axis of the head.

6. The method of relieving the side surfaces of blades of a spherical face-mill gear cutter which comprises employing a rotary grinding wheel of cupped form that has its tip surface dressed to spherical shape, mounting the blades to be relieved in a rotary head so that they extend in the general direction of the axis of the head, and rotating the wheel on its axis while rotating the head on its axis, and effecting a relative reciprocatory movement between the wheel and head in the direction of the axis of the head once for each blade to be relieved, and simultaneously producing a relative oscillatory movement between the wheel and head once for each blade to be relieved about an axis parallel to the axis of the head and passing through the center of the spherical surface of the wheel.

7. The method of relieving the side surfaces of blades of a spherical face-mill gear cutter which comprises employing rotary grinding wheels of cupped form for grinding both the inside and outside surfaces of the blades, the tip surface of the wheel used for grinding the outside surfaces of the blades being dressed to concave spherical shape, and the tip surface of the wheel used for grinding the inside surfaces of the blades being dressed to convex spherical shape, mounting the blades to be ground in a rotary head so that the blades extend in the general direction of the axis of the head and grinding both the outside and inside surfaces of the blades by rotating the head on its axis past a rotating wheel while effecting relative reciprocatory movements between the head and wheel, once for each blade to be relieved, in the direction of the axis of the head and simultaneously producing relative oscillatory movements between the wheel and head, once for each blade to be relieved, about an axis parallel to the axis of the head and passing through the sphere center of the wheel.

8. Apparatus for relieving face-mill gear cutter blades comprising a rotary grinding wheel, a rotary blade support, means for rotating the blade support to move the blades past the rotating grinding wheel, means for simultaneously effecting a relative reciprocatory movement between the blade support and wheel once for each blade to be ground, and means for simultaneously producing an oscillatory movement between the blade support and wheel once for each blade to be ground about an axis parallel to but offset from the axis of the blade support.

9. Apparatus for relieving face-mill gear cutter blades comprising a rotary grinding wheel, a rotary blade support, means for rotating the blade support on its axis to move the blades past the rotating grinding wheel, means for effecting a relative reciprocatory movement between the wheel and blade support axially of the blade support once for each blade to be ground, means for effecting a relative oscillatory movement between the wheel and blade support about an axis parallel to but offset from the axis of the blade support once for each blade to be ground, and means for periodically varying the rate of rotation of the blade support once for each blade to be ground.

10. Apparatus for relieving face-mill gear cutter blades comprising a rotary grinding wheel, a rotary blade support, means for rotating the blade support on its axis to move the blades past the rotating grinding wheel, said means comprising a worm and wormwheel, means for rotating the worm, and a cam for reciprocating the worm axially once for each blade to be ground, means for effecting a relative reciprocatory movement between the wheel and blade support in the direction of the axis of the blade support once for each blade to be relieved, and means for simultaneously effecting a relative oscillatory movement between the wheel and blade support once for each blade to be relieved about an axis parallel to but offset from the axis of the blade support.

11. Apparatus for relieving face-mill gear cutter blades comprising a rotary grinding wheel, a rotary blade support, means for rotating the blade support on its axis to move the blades past the rotating grinding wheel, said means comprising a worm and wormwheel, means for rotating the worm, and a cam for reciprocating the worm axially in time with the worm rotation once for each blade to be ground, a carrier in which the blade support is eccentrically mounted for rotation and axial reciprocation, a cam driven in time with the worm and wormwheel to effect a reciprocatory movement of the blade support once for each blade to be ground, an oscillatory support in which the carrier is eccentrically mounted, and a cam driven in time with the worm and wormwheel to effect oscillation of the last named support, once for each blade to be ground, about an axis offset from but parallel to the axis of the blade support.

12. Apparatus for relieving face-mill gear cutter blades comprising a rotary grinding wheel of cupped form which has its tip surface dressed to conform to the profile shape of the blade surfaces to be relieved, a rotary blade support, means for rotating the blade support to move the blades past the rotating grinding wheel, means for effecting a relative reciprocatory movement between the blade support and wheel once for each blade to be relieved, and means for effecting a relative oscillatory movement between the wheel and blade support, once for each blade to be relieved, about an axis parallel to but offset from the axis of the blade support.

13. Apparatus for relieving face-mill gear cutter blades comprising a rotary grinding wheel of cupped form which has a spherical tip surface, a rotary blade support, means for rotating the blade support to move the blades past the rotating grinding wheel, means for effecting a relative reciprocatory movement between the blade support and wheel once for each blade to be relieved, and means for effecting a relative oscillatory movement between the blade support and wheel once for each blade to be relieved about an axis parallel to but offset from the axis of the blade support and passing through the center of the sphere surface of the grinding wheel.

14. Apparatus for relief-grinding cutter blades comprising a rotary grinding wheel, a rotary blade support, means for rotating the blade support on its axis to move the blades past the rotating grinding wheel, means for effecting a relative reciprocatory movement between the wheel and blade support in the general direction of the height of a blade once for each blade to be relieved, and means for simultaneously effecting a relative oscillatory movement between the wheel and blade support about an axis parallel to but offset from the axis of the blade support, once for each blade to be relieved.

15. The method of relieving side surfaces of face-mill gear cutter blades of straight profile which comprises mounting the blades in a rotary head so that they are arranged circularly about the axis of the head and extend in the general direction of the axis of the head, employing a cup-shaped grinding wheel that has a plane tip surface perpendicular to the axis of the wheel, positioning the wheel so that its tip surface engages a side surface of a blade and the axis of the wheel is inclined to a plane perpendicular to the axis of the head at the pressure angle of the side surface of a blade to be relieved, and rotating the wheel on its axis, while effecting a relative helical motion between wheel and head in the direction of the axis of the head to relieve each blade.

16. The method of relieving the outside surfaces of spherical face-mill gear blades which comprises mounting the blades in a rotary head so that they are arranged circularly about the axis of the head and extend in the general direction of the axis of the head, employing a cup-shaped grinding wheel that has a tip surface of concave spherical shape, positioning the wheel so that its tip surface engages the outside surface of a blade and its axis is inclined to a plane perpendicular to the axis of the head at the pressure angle of a side surface of a blade, rotating the wheel on its axis, and effecting a relative helical motion between wheel and head in the direction of the axis of the head to relieve each blade.

17. The method of relieving the side surfaces of face-mill gear cutter blades, which comprises mounting the blades in a rotary head so that they are arranged circularly about the axis of the head and extend in the direction of the axis of the head, employing a cup-shaped grinding wheel whose tip surface conforms generally to the profile shape of the blade surfaces to be relieved, positioning the grinding wheel in engagement with a cutter blade so that the tip surface of the wheel engages a side surface of a blade and the axis of the wheel is substantially perpendicular to said side surface, rotating the wheel on its axis and effecting relative angular movement between wheel and head about the axis of the head, and simultaneously effecting relative angular movement in a direction generally opposite to the last named movement and about an axis offset from but parallel to the axis of the head.

18. The method of relieving the side surfaces of face mill gear cutter blades which comprises mounting the blades in a rotary head so that they are arranged circularly about the axis of the head and extend in the general direction of said axis, employing a cup-shaped grinding wheel, positioning said wheel so that its axis is inclined to a plane perpendicular to the axis of the head at substantially the pressure angle of the side surface of a blade to be ground and is offset from the axis of the head and so that the tip surface of the wheel is in engagement with the said side surface of the blade, and rotating the wheel on its axis while rotating the head on its axis and effecting a relative reciprocatory movement between the wheel and head in the direction of the axis of the head in time with the head rotation and once for each blade to be ground, whereby to relieve the side surface of a blade during the forward portion of each reciprocatory movement and to reposition the head and wheel relative to one another ready for relieving of the next blade during the return portion of each reciprocatory movement.

19. The method of relieving the side surfaces of face mill cutter blades which comprises mounting the blades in a rotary head so that they are arranged circularly about the axis of the head and extend in the general direction of said axis, employing a cup-shaped grinding wheel which has a tip surface that is plane and perpendicular to the axis of the wheel, positioning said wheel so that its axis is offset from the axis of the head and is inclined to a plane perpendicular to the axis of the head at substantially the pressure angle of the side surfaces of the blades to be ground, and so that the tip surface of the wheel is in engagement with the side surface of the blade, and rotating the wheel on its axis while rotating the head on its axis and effecting a relative reciprocatory movement between the wheel and head in the direction of the axis of the head in time with the head rotation and once for each blade to be ground, whereby to relieve the side surface of a blade during the forward portion of each reciprocatory movement and to reposition the head and wheel relative to one another ready for relieving of the next blade during the return portion of each reciprocatory movement.

20. The method of relieving the side surfaces of face mill gear cutter blades of curved profile which comprises mounting the blades in a rotary head so that they are arranged circularly about the axis of the head and extend in the general direction of said axis, employing a cup shaped grinding wheel which has a spherical tip surface, positioning said wheel so that its axis is offset from the axis of the head and is inclined to a plane perpendicular to the axis of the head at substantially the pressure angle of the side surfaces of the blades to be ground, and so that the tip surface of the wheel is in engagement with the side surface of the blade, and rotating the wheel on its axis while rotating the head on its axis, and effecting a relative reciprocatory movement between the wheel and head in the direction of the axis of the head in time with the head rotation and once for each blade to be ground, whereby to relieve the side surface of a blade during the forward portion of each reciprocatory movement and to reposition the head and wheel relative to one another ready for relieving the next blade during the return portion of each reciprocatory movement.

21. The method of relieving the side surfaces of face mill gear cutter blades which comprises mounting the blades in a rotary head so that they are arranged circularly about the axis of the head and extend in the general direction of said axis, employing a cup-shaped grinding wheel which has a spherical tip surface, positioning said wheel so that its axis passes through the sphere center of a side surface of a blade and the tip surface of the wheel is in engagement with said side surface, rotating the wheel on its axis while rotating the head on its axis at a varying rate, the rate of the head rotation being uniform during relieving of a blade, and effecting a relative reciprocatory movement between the wheel and head in the direction of the axis of the head in time with the head rotation, said last named movement being in one direction during the relieving of a blade and in the opposite direction when each blade has been relieved in order to position the wheel and head relative to one another ready for the relieving of the following blade, and effecting a relative oscillatory movement between the wheel and head about an axis offset from but parallel to the axis of the head and intersecting the wheel axis, said oscillatory movement being at a uniform velocity and in a direction opposite to the rotary motion of the head during the relieving of a blade.

ERNEST WILDHABER.